(12) United States Patent
Zhang et al.

(10) Patent No.: US 9,072,083 B2
(45) Date of Patent: Jun. 30, 2015

(54) METHODS AND SYSTEMS FOR CSI-RS RESOURCE ALLOCATION IN LTE-ADVANCE SYSTEMS

(75) Inventors: Wenfeng Zhang, Plano, TX (US); Jing Jiang, Xi'an Shanghai Province (CN)

(73) Assignee: ZTE CORPORATION, Shenzhen (CN)

( * ) Notice: Subject to any disclaimer, the term of this patent is extended or adjusted under 35 U.S.C. 154(b) by 392 days.

(21) Appl. No.: 13/579,494

(22) PCT Filed: Feb. 24, 2011

(86) PCT No.: PCT/US2011/026118
§ 371 (c)(1),
(2), (4) Date: Dec. 27, 2012

(87) PCT Pub. No.: WO2011/106559
PCT Pub. Date: Sep. 1, 2011

(65) Prior Publication Data
US 2013/0088949 A1   Apr. 11, 2013

Related U.S. Application Data

(60) Provisional application No. 61/307,807, filed on Feb. 24, 2010, provisional application No. 61/349,153, filed on May 27, 2010.

(51) Int. Cl.
H04W 72/04 (2009.01)
H04L 5/00 (2006.01)

(52) U.S. Cl.
CPC ............. *H04W 72/04* (2013.01); *H04L 5/0007* (2013.01); *H04L 5/0048* (2013.01); *H04L 5/0053* (2013.01)

(58) Field of Classification Search
CPC ..................................................... H04W 72/04
See application file for complete search history.

(56) References Cited

U.S. PATENT DOCUMENTS 7,564,829 B2   7/2009   Jin et al.
7,940,740 B2 *  5/2011   Krishnamurthy et al. .... 370/344
(Continued)

FOREIGN PATENT DOCUMENTS

JP   2011-142406     7/2011
KR   10-2008-0054164   6/2008
(Continued)

OTHER PUBLICATIONS

U.S. Appl. No. 61/300,820, filed Feb. 2, 2010, Kim et al., "R-PDCCH Reg Design Considering CSI-RS".*
(Continued)

*Primary Examiner* — Gregory Sefcheck
(74) *Attorney, Agent, or Firm* — Duane Morris LLP

(57) ABSTRACT

A method of allocating resource elements in an orthogonal frequency division multiplexed (OFDM) system for transmission of a channel state information reference signal (CSI-RS) is disclosed. The method includes converting one or more resource elements to a two-dimensional frequency-time domain; and partitioning the one or more converted resource elements to units of a physical resource block (PRB). One or more resource elements are patterned over at least a portion of the PRB for transmission of the CSI-RS. According to an embodiment, the CSI-RS resource elements with a same subcarrier index for a common cell are code division multiplexed (CDM), with a CDM dimension equal to a number of CSI-RS resource elements with the same subcarrier index for the common cell.

34 Claims, 5 Drawing Sheets

(56) References Cited

U.S. PATENT DOCUMENTS

| | | | | |
|---|---|---|---|---|
| 8,165,586 B2* | 4/2012 | Krishnamurthy et al. | .... | 455/436 |
| 8,396,047 B2* | 3/2013 | Krishnamurthy et al. | .... | 370/344 |
| 8,400,908 B2* | 3/2013 | Chun et al. | .... | 370/210 |
| 8,520,617 B2* | 8/2013 | Krishnamurthy et al. | .... | 370/329 |
| 8,730,925 B2* | 5/2014 | Frank et al. | .... | 370/336 |
| 8,837,380 B2* | 9/2014 | Montojo et al. | .... | 370/329 |
| 8,885,581 B2* | 11/2014 | Tee et al. | .... | 370/329 |
| 2008/0232504 A1 | 9/2008 | Ma et al. | | |
| 2009/0168716 A1 | 7/2009 | Moon et al. | | |
| 2012/0039256 A1* | 2/2012 | Kwon et al. | .... | 370/328 |
| 2012/0057519 A1* | 3/2012 | Kim et al. | .... | 370/315 |
| 2013/0044722 A1* | 2/2013 | Kang et al. | .... | 370/329 |

FOREIGN PATENT DOCUMENTS

| | | |
|---|---|---|
| WO | WO-2008-021573 | 2/2008 |
| WO | WO-2012/111623 A1 | 8/2012 |

OTHER PUBLICATIONS

U.S. Appl. No. 61/299,325, filed Jan. 28, 2010, Kim et al., "Reg Indexing and RS Used for R-PDCCH".*

Huawei, "CSI-RS pattern design," 3GPP Draft, R1-101057, 3$^{rd}$ Generation Partnership Project (3GPP), TSG RAN WG1 Meeting # 60, Feb. 22-26, 2010, Feb. 16, 2010, San Francisco, 4 pages.

Nokia et al., "On the need for inter-cell CSI-RS muting," 3GPP Draft, R1-101427, 3$^{rd}$ Generation Partnership Project (3GPP), TSG-RAN WG1 Meeting # 60, Feb. 22-26, 2010, Feb. 16, 2010, San Francisco, 8 pages.

Pantech, "Inter-cell CSI-RS Pattern Design for LTE-A," 3GPP Draft, R1-100990, 3$^{rd}$ Generation Partnership Project (3GPP), TSG RAN WG1 Meeting # 60, Feb. 22-26, 2010, Feb. 16, 2010, San Francisco, 4 pages.

ZTE Corporation, "CSI-RS Pattern Design for LTE-Advanced," 3GPP Draft, R1-100969, 3$^{rd}$ Generation Partnership Project (3GPP), TSG-RAN WG1 Meeting # 60, Feb. 22-26, 2010, Feb. 18, 2010, San Francisco, 7 pages.

ZTE Corporation, "Investigation on CSI-RS Muting," 3GPP Draft, R1-103587, 3$^{rd}$ Generation Partnership Project (3GPP), TSG RAN WG1 Meeting # 61bis, Jun. 28-Jul. 2, 2010, Jun. 23, 2010, Dresden, Germany, 8 pages.

Supplementary Extended European Search Report issued on May 2, 2013 in corresponding European Patent Application No. 11748088. 9, 11 pages.

PCT/US2011/026118 International Search Report and Written Opinion mailed Oct. 21, 2011.

PCT/US2011/026118 IPRP mailed Aug. 28, 2012.

RU2011132139/07 Office Action mailed Sep. 18, 2012.

JP2012502330 Office Action mailed Nov. 1, 2012.

ZTE Corporation, "Intra-cell CSI-RS design for LTE-Advanced," Meeting 3GPP R1-100536, Jan. 22, 2010.

NTT DOCOMO, "Investigation on Optimum CSI-RS Density for LTE-Advanced," Meeting 3 GPP R1-100497, Jan. 22, 2010.

Huawei, "Further Design and Evaluation on CSI-RS for LTE-A," Meeting 3GPP R1-094704, Nov. 13, 2009.

Fujitsu, "Considerations on CSI RS design in LTE-A," Meeting 3GPP R1-094941, Nov. 13, 2009.

WOASiS, Multi-Cell CSI-RS Pattern and Sequence, Meeting 3GPP R1-094907, Nov. 13, 2009.

Qualcomm Europe, Details of CSI-RS, Meeting 3GPP R1-094867, Nov. 13, 2009.

\* cited by examiner

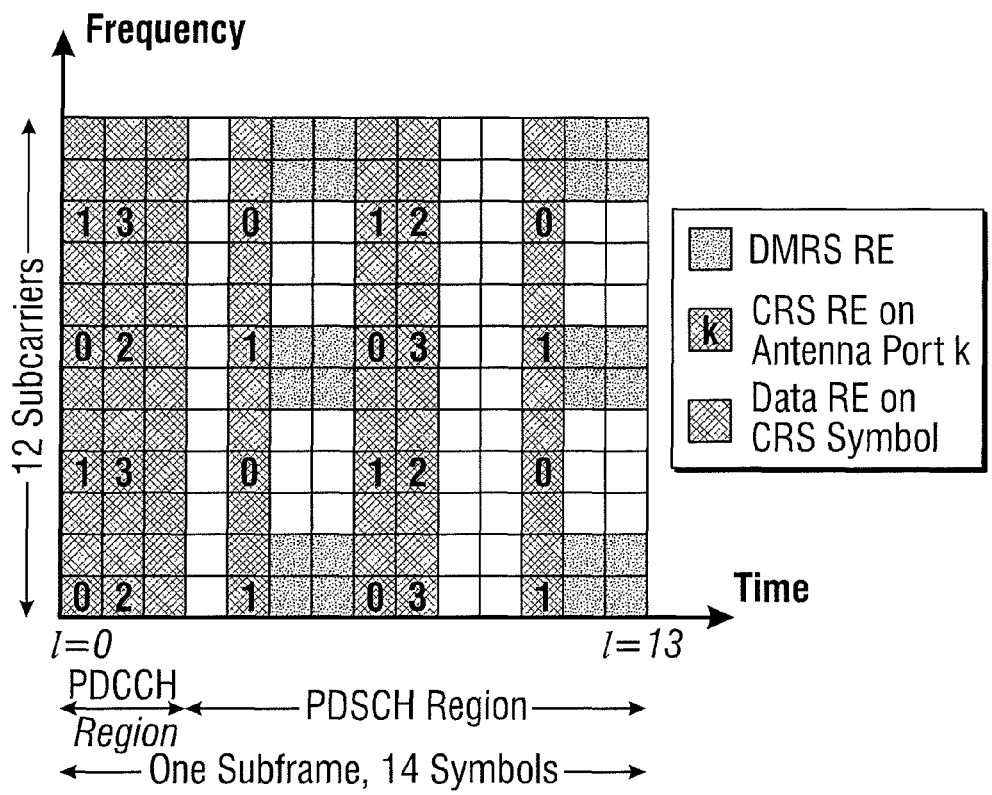
*FIG. 2*
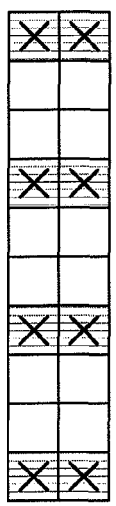 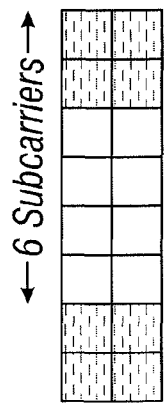
*FIG. 3A*  *FIG. 3B*

METHODS AND SYSTEMS FOR CSI-RS RESOURCE ALLOCATION IN LTE-ADVANCE SYSTEMS

CROSS-REFERENCE TO RELATED APPLICATIONS

This application claims priority to U.S. Provisional Patent Application No. 61/307,807 filed on Feb. 24, 2010, entitled "CSI-RS RESOURCE ALLOCATION IN LTE-ADVANCE SYSTEMS," and U.S. Provisional Patent Application No. 61/349,153, filed on May 27, 2010, entitled "METHODS AND SYSTEMS FOR TRANSMISSION OF CSI-RS IN LTE-ADVANCE SYSTEMS," the contents of both of which are incorporated by reference herein in their entirety.

FIELD OF THE INVENTION

The present invention relates generally to wireless communication, and more particularly to methods and systems for allocating channel state information reference signals (CSI-RS) resources and transmitting CSI-RS(s) in a wireless communication system.

BACKGROUND

In wireless communication systems, downlink reference signals are normally created to provide reference for channel estimation used in coherent demodulation as well as a reference for a channel quality measurement used in multi-user scheduling. In the LTE Rel-8 specification, one single type of downlink reference format called a cell-specific reference signal (CRS) is defined for both channel estimation and channel quality measurement. The characteristics of Rel-8 CRS include that, regardless of multiple in, multiple out (MIMO) channel rank that the user equipment (UE) actually needs, the base station can always broadcast the CRS to all UE based on the largest number of MIMO layers/ports.

In the 3GPP LTE Rel-8 system, the transmission time is partitioned into units of a frame that is 10 ms long and is further equally divided into 10 subframes, which are labeled as subframe #0 to subframe #9. While the LTE frequency division duplexing (FDD) system has 10 contiguous downlink subframes and 10 contiguous uplink subframes in each frame, the LTE time-division duplexing (TDD) system has multiple downlink-uplink allocations, whose downlink and uplink subframe assignments are given in Table 1, where the letters D, U and S represent the corresponding subframes and refer respectively to the downlink subframe, uplink subframe and special subframe that contains the downlink transmission in the first part of a subframe and the uplink transmission in the last part of subframe.

TABLE 1

| | | Subframe number | | | | | | | | | |
|---|---|---|---|---|---|---|---|---|---|---|---|
| Uplink-downlink configuration | Downlink-to-Uplink Switch-point periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In one system configuration instance (called normal cyclic prefix, or normal-CP) in LTE, each subframe includes 14 equal-duration time symbols with the index from 0 to 13. The frequency domain resource, up to the full bandwidth within one time symbol, is partitioned into subcarriers. One physical resource block (PRB) is defined over a rectangular 2-D frequency-time resource area, covering 12 contiguous subcarriers over the frequency domain and 1 subframe over the time domain, and holding $12*14=168$ resource elements (RE), as shown in FIG. 2, for example. In addition, each subframe can also contain two equal-length slots, with each slot containing 7 OFDM symbols. In normal-CP configuration, the OFDM symbols are indexed per slot, where the symbol index runs from 0 to 6; the OFDM symbols can be also indexed per subframe, where the symbol index runs from 0 to 13.

Each regular subframe is partitioned into two parts: the PDCCH (physical downlink control channel) region and the PDSCH (physical downlink shared channel) region. The PDCCH region normally occupies the first several symbols per subframe and carries the handset specific control channels, and the PDSCH region occupies the rest of the subframe and carries the general-purpose traffic. The LTE system requires the following downlink transmissions to be mandatory:

Primary synchronization signal (PSS) and secondary synchronization signal (SSS): These two signals repeat in every frame and serve for the initial synchronization and cell identification detection after UE powers up. The transmission of PSS occurs at symbol #6 in subframes {0,5} for FDD systems with normal-CP, and at symbol #2 in subframes {1,6} for TDD systems; the transmission of SSS occurs at symbol #5 in subframes {0,5} for FDD with normal-CP, and at symbol #13 in subframes {0,5} for TDD with normal-CP;

Physical broadcast channel (PBCH): PBCH also repeats in every frame, and serves for broadcasting of essential cell information. Its transmission occurs over 4 symbols {7~10} in subframe #0;

Cell-specific reference signal (CRS): CRS serves for downlink signal strength measurement, and for coherent demodulation of PDSCH in the same resource block. Sometimes it is also used for verification of cell identification done on PSS and SSS. CRS transmission has the same pattern in each regular subframe, and occurs on symbols {0,1,4,7,8,11} with a maximum of four transmission antenna ports in a normal-CP subframe. Each CRS symbol carries two CRS subcarriers per port per resource block dimension in frequency domain, as shown in FIG. 2;

System information block (SIB): SIB is the broadcast information that is not transmitted over PBCH. It is carried in a specific PDSCH that is decoded by every handset. There are multiple types of SIB in LTE, most of which have a configurably longer transmission cycle, except SIB type-1 (SIB1). SIB1 is fix-scheduled at subframe #5 in every even frame. SIB is transmitted in PDSCH identified by a system information radio network temporary identifier (SI-RNTI) given in the corresponding PDCCH; and Paging channel (PCH): The paging channel is used to address the handset in idle mode or to inform the handset of a system-wide event, such as the modification of content in SIB. In LTE Rel-8, PCH can be sent in any subframe from a configuration-selective set from {9}, {4,9} and {0,4,5,9} for FDD and {0}, {0,5}, {0,1,5,6} for TDD. PCH is transmitted in PDSCH identified by the paging RNTI (P-RNTI) given in the corresponding PDCCH.

Note that PSS/SSS/PBCH are transmitted within the six central PRBs in frequency domain, while SIB and PCH could be transmitted at any portion within the whole frequency bandwidth, which is at least six PRBs.

Besides the regular subframe as shown in FIG. 2, LTE systems also define one special subframe type—Multi-Media Broadcast over a Single Frequency Network (MBSFN) subframe. This type of subframe is defined to exclude regular data traffic and CRS from the PDSCH region. In other words, this type of subframe can be used by a base station, for example, to identify a zero-transmission region so that the handset would not try to search for the CRS within this region. The downlink subframes {1,2,3,6,7,8} in FDD and the downlink subframes {3,4,7,8,9} in TDD can be configured as an MBSFN subframe. In this disclosure, subframes are termed MBSFN-capable subframes, while the rest of downlink subframes may be referred to as non-MBSFN-capable subframes. Note that most of the essential downlink signals and channels discussed above (e.g., PSS/SSS, PBCH, SIB and PCH) are transmitted in non-MBSFN-capable subframes.

As 3GPP LTE evolves from Rel-8 to Rel-10 (also called LTE-advance or LTE-A), due to the large number of supported antenna ports (up to 8), it can cost a large amount of overhead to maintain the CRS-like reference signal on all ports. It is agreed to separate downlink reference signal roles to the following different RS signaling:

Demodulation reference signal (DMRS): this type of RS is used for coherent channel estimation and should have sufficient density and should be sent on a per UE basis; and Channel state information reference signal (CSI-RS): this type of RS is used for channel quality measurement by all UEs and could be implemented over the frequency-time domain.

It is agreed in the 3GPP standard body that: DMRS patterns in each PRB is determined to be located at 24 REs as shown in FIG. 2; CSI-RS RE can not be allocated to symbols carrying PDCCH and Rel-8 CRS (i.e., CSI-RS cannot be allocated to REs on the symbols labeled as "CRS RE on antenna port k" and "Data RE on CRS symbol" in FIG. 2); the CSI-RS can only be inserted in resource elements which will not be interpreted by Rel-8 UEs as PSS/SSS or PBCH; the same CSI-RS pattern is desired between a non-MBSFN subframe and an MBSFN subframe. In other words, the CSI-RS pattern is designed based on the available resources in a non-MBSFN subframe; CSI-RS transmission cycles per cell is an integer multiple of 5ms, and per-cycle transmission of CSI-RS RE for all ports per cell is performed within a single subframe; and $N_{ANT}$ is denoted as the number of CSI-RS antenna ports per cell. The average density of CSI-RS is one RE per antenna port per PRB for $N_{ANT} \in \{2,4,8\}$.

Based on these agreements, this disclosure provides further principles and methods to allocate CSI-RS signals, among other features that will become apparent in light of the following description. These and other implementations and examples of the cell identification methods in software and hardware are described in greater detail in the attached drawings and detailed description.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment of the present invention is directed to a method of allocating resource elements in an orthogonal frequency division multiplexed (OFDM) system for transmission of a channel state information reference signal (CSI-RS) is disclosed. The method includes converting one or more resource elements to a two-dimensional frequency-time domain; and partitioning the one or more converted resource elements to units of a physical resource block (PRB). One or more resource elements are patterned over at least a portion of the PRB for transmission of the CSI-RS. According to various embodiments, the method can include transmitting the CSI-RS using one or more resource elements determined based on whether the one or more resource elements are available to the CSI-RS in a regular downlink subframe that includes at least one of a cell-specific reference signal (CRS), a physical downlink control channel (PDCCH) and a demodulation reference signal (DMRS). According to an embodiment, the CSI-RS resource elements with a same subcarrier index for a common cell are code division multiplexed (CDM), with a CDM dimension equal to a number of CSI-RS resource elements with the same subcarrier index for the common cell.

Another embodiment is directed to a station configured to allocate resource elements in an OFDM system for transmission of a CSI-RS. The station can include a converting unit configured to convert one or more resource elements to a two-dimensional frequency-time domain; a partitioning unit configured to partition the one or more converted resource elements to units of a physical resource block (PRB); and a patterning unit configured to pattern one or more resource elements over at least a portion of the PRB for transmission of the CSI-RS. According to certain embodiments, the station is a base station; however, any station (e.g., a mobile station) can perform the foregoing features as well.

Yet another embodiment is directed to a non-transitory computer-readable medium storing instructions thereon to perform a method of allocating resource elements in an OFDM system for transmission of a CSI-RS. The method can include converting one or more resource elements to a two-dimensional frequency-time domain; and partitioning the one or more converted resource elements to units of a physical resource block (PRB). One or more resource elements are patterned over at least a portion of the PRB for transmission of the CSI-RS.

Further features and advantages of the present invention, as well as the structure and operation of various embodiments of the present invention, are described in detail below with reference to the accompanying drawings.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

FIG. 2 depicts a physical resource block with CRS and DMRS, according to one embodiment of the present invention.

FIG. 3A is an exemplary CSI-RS per-cell pattern (Type 1), according to one embodiment of the present invention.

FIG. 3B is an exemplary CSI-RS per-cell pattern (Type 2), according to one embodiment of the present invention.

DETAILED DESCRIPTION OF EXEMPLARY EMBODIMENTS

Figure 1:
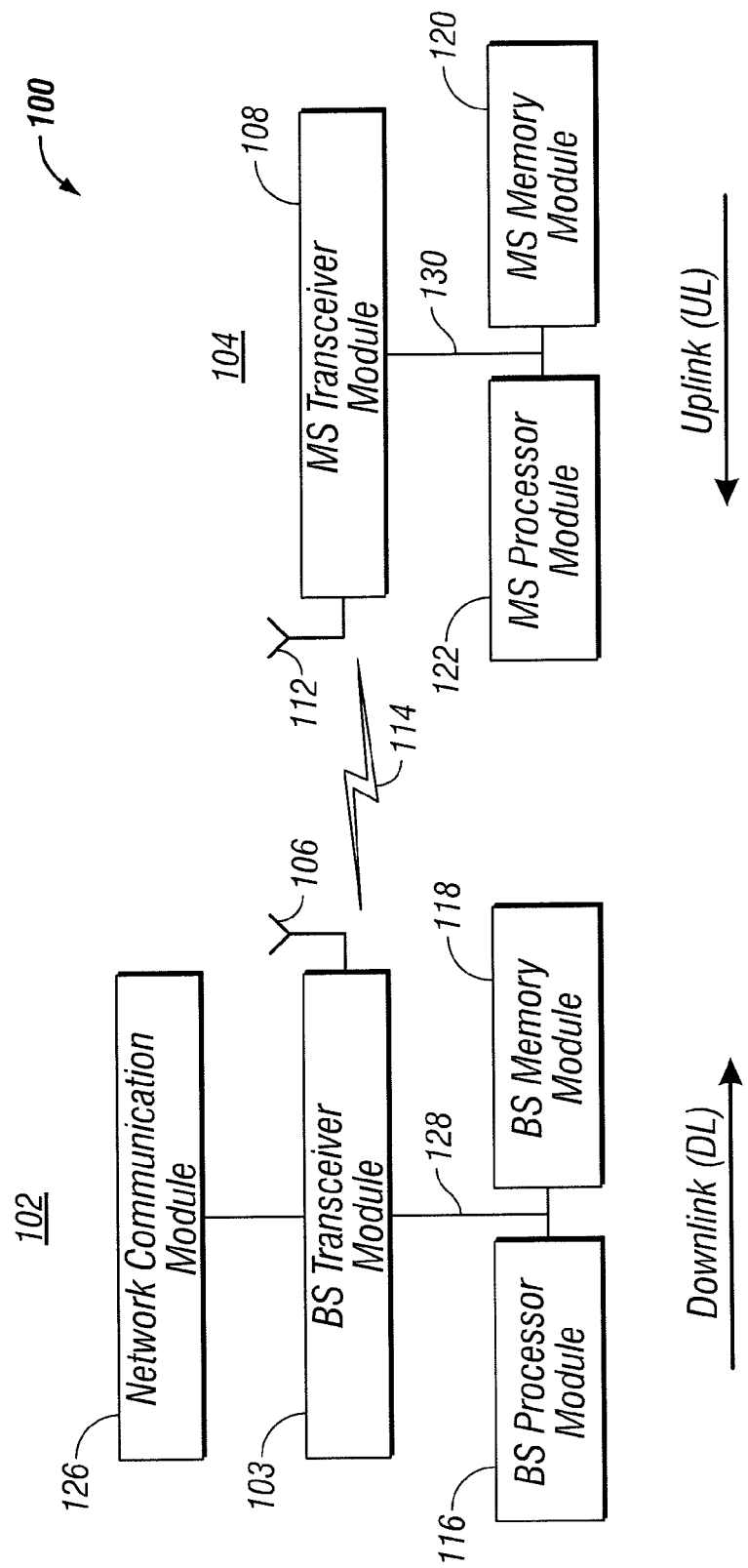
FIG. 1 shows an exemplary wireless communication system for transmitting and receiving transmissions, according to one embodiment of the present invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

FIG. 1 shows an exemplary wireless communication system 100 for transmitting and receiving transmissions, in accordance with one embodiment of the present invention. The system 100 may include components and elements configured to support known or conventional operating features that need not be described in detail herein. System 100 generally comprises a base station 102 with a base station transceiver module 103, a base station antenna 106, a base station processor module 116 and a base station memory module 118. System 100 generally comprises a mobile station 104 with a mobile station transceiver module 108, a mobile station antenna 112, a mobile station memory module 120, a mobile station processor module 122, and a network communication module 126. Of course both base station 102 and mobile station 104 may include additional or alternative modules without departing from the scope of the present invention. Further, only one base station 102 and one mobile station 104 is shown in the exemplary system 100; however, any number of base stations 102 and mobile stations 104 could be included.

These and other elements of system 100 may be interconnected together using a data communication bus (e.g., 128, 130), or any suitable interconnection arrangement. Such interconnection facilitates communication between the various elements of wireless system 100. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary system 100, the base station transceiver 103 and the mobile station transceiver 108 each comprise a transmitter module and a receiver module (not shown). Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa.

In the particular example system depicted in FIG. 1, an "uplink" transceiver 108 includes a transmitter that shares an antenna with an uplink receiver. A duplex switch may alternatively couple the uplink transmitter or receiver to the uplink antenna in time duplex fashion. Similarly, a "downlink" transceiver 103 includes a receiver which shares a downlink antenna with a downlink transmitter. A downlink duplex switch may alternatively couple the downlink transmitter or receiver to the downlink antenna in time duplex fashion.

The mobile station transceiver 108 and the base station transceiver 103 are configured to communicate via a wireless data communication link 114. The mobile station transceiver 108 and the base station transceiver 102 cooperate with a suitably configured RF antenna arrangement 106/112 that can support a particular wireless communication protocol and modulation scheme. In the exemplary embodiment, the mobile station transceiver 108 and the base station transceiver 102 are configured to support industry standards such as the Third Generation Partnership Project Long Term Evolution (3GPP LTE), Third Generation Partnership Project 2 Ultra Mobile Broadband (3Gpp2 UMB), Time Division-Synchronous Code Division Multiple Access (TD-SCDMA), and Wireless Interoperability for Microwave Access (WiMAX), and the like. The mobile station transceiver 108 and the base station transceiver 102 may be configured to support alternate, or additional, wireless data communication protocols, including future variations of IEEE 802.16, such as 802.16e, 802.16m, and so on.

According to certain embodiments, the base station 102 controls the radio resource allocations and assignments, and the mobile station 104 is configured to decode and interpret the allocation protocol. For example, such embodiments may be employed in systems where multiple mobile stations 104 share the same radio channel which is controlled by one base station 102. However, in alternative embodiments, the mobile station 104 controls allocation of radio resources for a particular link, and could implement the role of radio resource controller or allocator, as described herein.

Processor modules 116/122 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 116/122 comprise processing logic that is configured to carry out the functions, techniques, and processing tasks associated with the operation of system 100. In particular, the processing logic is configured to support the frame structure parameters described herein. In practical embodiments the processing logic may be resident in the base station and/or may be part of a network architecture that communicates with the base station transceiver 103.

The steps of a method or algorithm described in connection with the embodiments disclosed herein may be embodied directly in hardware, in firmware, in a software module executed by processor modules 116/122, or in any practical combination thereof. A software module may reside in memory modules 118/120, which may be realized as RAM memory, flash memory, ROM memory, EPROM memory, EEPROM memory, registers, a hard disk, a removable disk, a CD-ROM, or any other form of storage medium known in the art. In this regard, memory modules 118/120 may be coupled to the processor modules 118/122 respectively such that the processors modules 116/120 can read information from, and write information to, memory modules 118/120. As an example, processor module 116, and memory modules 118, processor module 122, and memory module 120 may reside in their respective ASICs. The memory modules 118/120 may also be integrated into the processor modules 116/120. In an embodiment, the memory module 118/220 may include a cache memory for storing temporary variables or other intermediate information during execution of instructions to be executed by processor modules 116/222. Memory modules 118/120 may also include non-volatile memory for storing instructions to be executed by the processor modules 116/120.

Memory modules 118/120 may include a frame structure database (not shown) in accordance with an exemplary embodiment of the invention. Frame structure parameter databases may be configured to store, maintain, and provide data as needed to support the functionality of system 100 in the manner described below. Moreover, a frame structure database may be a local database coupled to the processors 116/122, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 126 generally represents the hardware, software, firmware, processing logic, and/or other components of system 100 that enable bi-directional communication between base station transceiver 103, and network components to which the base station transceiver 103 is connected. For example, network communication module 126 may be configured to support internet or WiMAX traffic. In a typical deployment, without limitation, network communication module 126 provides an 802.3 Ethernet interface such that base station transceiver 103 can communicate with a conventional Ethernet based computer network. In this manner, the network communication module 126 may include a physical interface for connection to the computer network (e.g., Mobile Switching Center (MSC)).

Note that the functions described in the present disclosure may be performed by either a base station 102 or a mobile station 104. A mobile station 104 may be any user device such as a mobile phone, and a mobile station may also be referred to as UE.

Embodiments disclosed herein have specific application but not limited to the Long Term Evolution (LTE) system that is one of the candidates for the 4-th generation wireless system. Embodiments described herein provide various CSI-RS per-cell patterns as shown in FIGS. 3A and 3B, for example. Each of these CSI-RS per-cell patterns shows a layout of eight CSI-RS REs that can belong to one single cell, according to various embodiments.

In FIGS. 3A and 3B, the CSI-RS REs belonging to the same cell are marked in the same pattern. It should be noted that any multiplexing scheme is allowed over each of these patterns, without departing from the scope of the present invention. For example, in FDM+TDM multiplexing, each CSI-RS RE can be used by only one CSI-RS antenna port; in CDM+FDM (also referred to CDM-T) multiplexing, the CSI-RS REs with the same subcarrier index for the same cell can be CDM multiplexed, with the CDM dimension equal to the number of CSI-RS REs with the same subcarrier index for the same single cell. For exemplary purposes, the CDM dimension can be 2 for CSI-RS per-cell pattern type1 (shown in FIG. 3A) and type2 (shown in FIG. 3B), or 4 for other CSI-RS per-cell patterns.

Figure 4A:
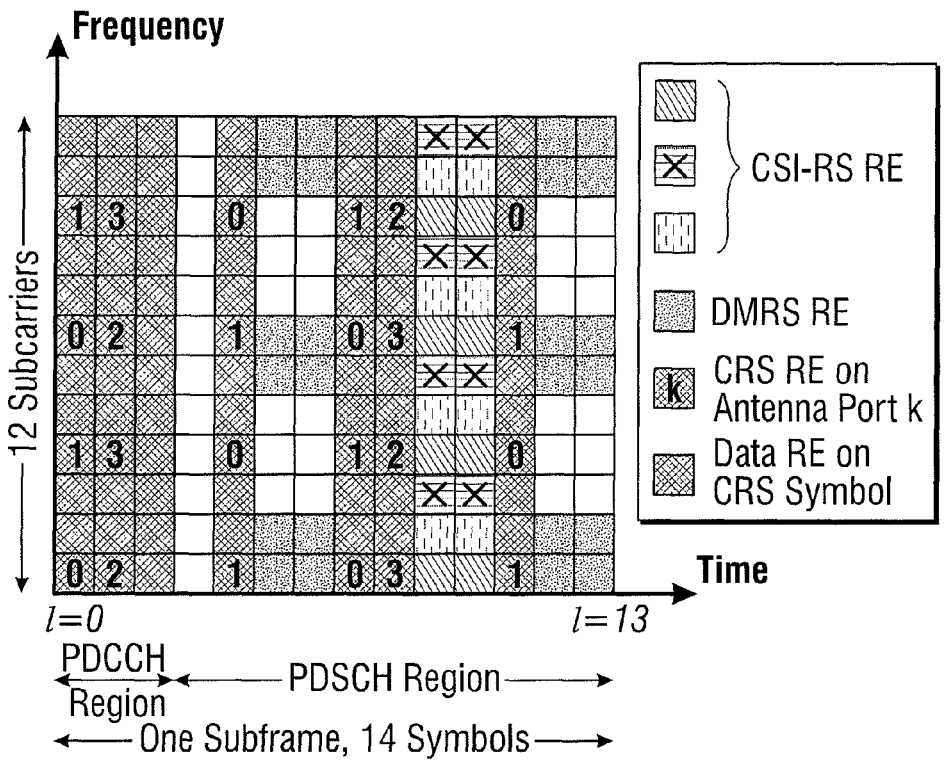
FIG. 4A is an exemplary CSI-RS per-cell pattern (Type 1) with a reuse factor of three, according to one embodiment of the present invention.
Figure 4B:
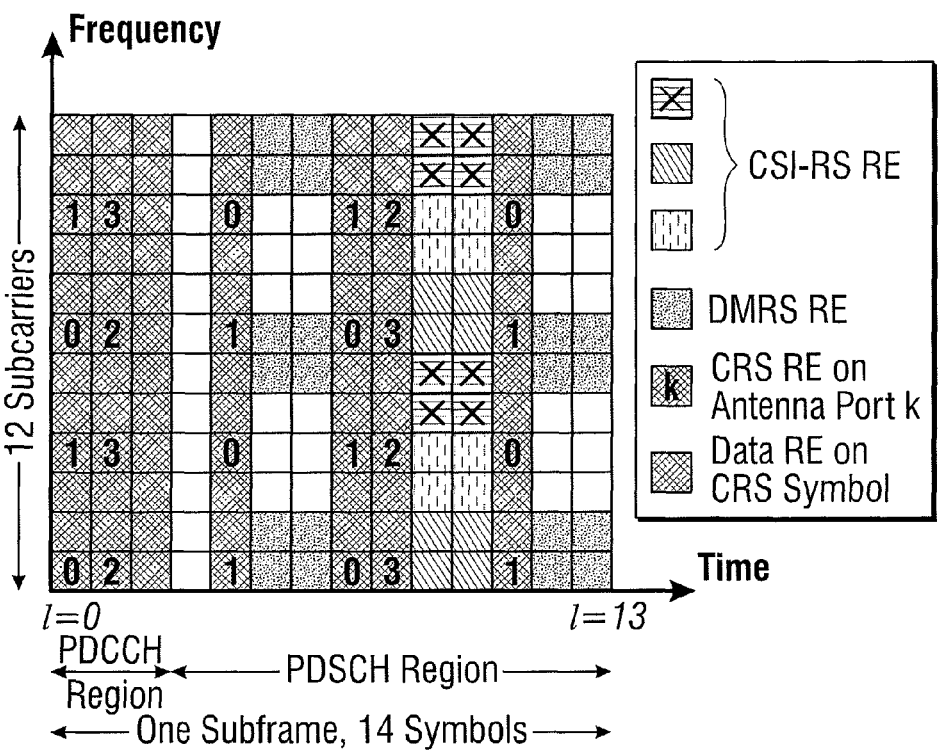
FIG. 4B is an exemplary CSI-RS per-cell pattern (Type 2) with a reuse factor of three, according to one embodiment of the present invention.

Based on these CSI-RS per-cell patterns, different CSI-RS patterns per PRB can be built. First, both CSI-RS per-cell pattern type1 and type2 can be applied to only symbols {9,10} in one subframe, as shown in FIGS. 4A and 4B, for example. In this case, the reuse factor is equal to three (i.e., three different cells can be multiplexed with each other in single subframe without overlapping). Meanwhile, it is possible to perform frequency-domain shifting in this particular pattern. This frequency domain shifting offset can be related to PCID modulo 3, where PCID is an integer representing the cell identification as provided in LTE Rel-8. To be more specific, the frequency domain shifting according to cell identification can be given by:

Assuming k as the subcarrier index corresponding to the RE that carries CSI-RS within one PRB, k=m·(PCID mod 3)+k$_0$, where:

For CSI-RS per-cell pattern type1, m=1 and k$_0$ ∈ {0,3,6,9,};

For CSI-RS per-cell pattern type2, m=2 and k$_0$ ∈ {0,1,6,7,}.

As shown by CSI-RS per-cell pattern type1 in FIG. 3A, for example, and CSI-RS pattern per PRB in FIG. 4A, for example, if the RE location of the most left-upper RE inside CSI-RS per-cell pattern type2 in one PRB can be represented by (k',l'), where 0≤k'<12 is the subcarrier index inside PRB and l' is the time symbol index inside the subframe, then RE locations in one PRB for all CSI-RS REs belonging to the same CSI-RS per-cell pattern type2, represented by (k,l), can be given by k=k'+Δ$_k$ where Δ$_k$ ∈ {0,−3,−6,−9} and l=l'+Δ$_l$ where Δ$_l$ ∈ {0,1}.

The relation between CSI-RS RE location and corresponding RE index can be further specified. For example, assuming the location in the PRB of the i-th CSI-RS RE labeled in the left figure of FIG. 7A can be represented by (k$_i$,l$_i$), then l$_i$=l'+(i mod 2) for 0≤i<8 and $$k_{2j} = k_{2j+1} = k' - (j \bmod 2) \times 6 - \left\lfloor \frac{j}{2} \right\rfloor \times 3$$

for 0≤j<4.

Figure 5:
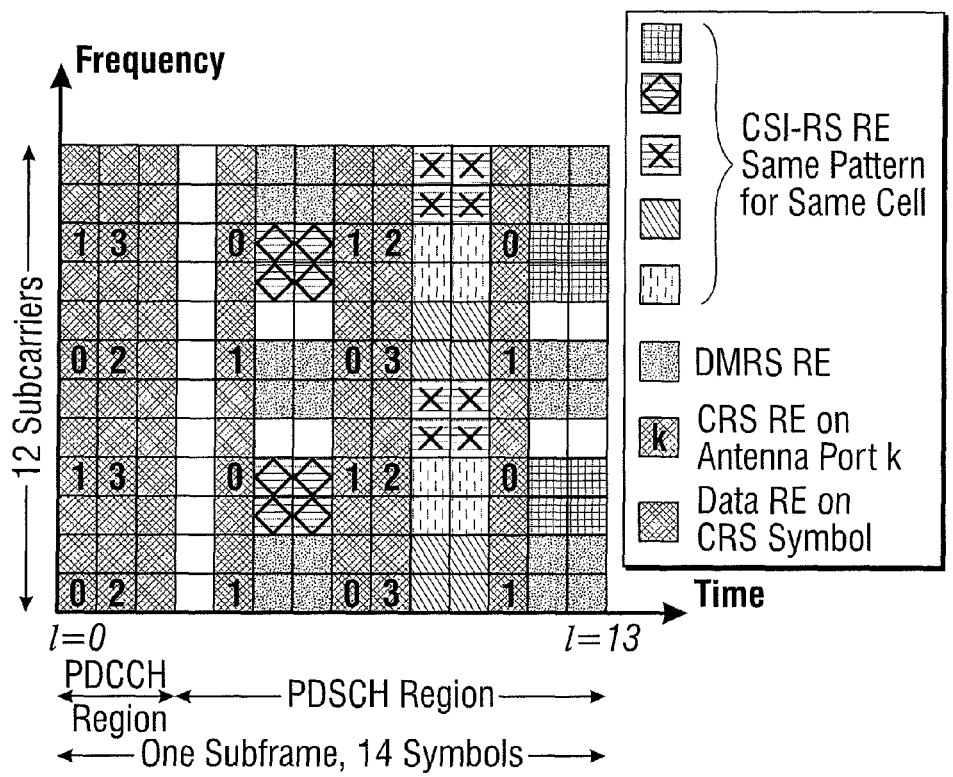
FIG. 5 is an exemplary CSI-RS per-cell pattern with a reuse factor of five, according to one embodiment of the present invention.

Next, the CSI-RS per-cell pattern type2 can be used alone to build the CSI-RS pattern per PRB as shown in FIG. 5, for example, with the CSI-RS pattern reuse factor equal to 5, in this particular embodiment.

As shown by CSI-RS per-cell pattern type2 in FIG. 3B and CSI-RS pattern per PRB in FIG. 5, if the RE location of the most left-upper RE inside the CSI-RS per-cell pattern type2 in one PRB is represented by (k',l'), where 0≤k'<12 is the subcarrier index inside PRB and l' is the time symbol index inside one subframe, then RE locations in one PRB for all CSI-RS REs belonging to the same CSI-RS per-cell pattern type2, represented by (k,l), can be given by k=k'+Δ$_k$ where Δ$_k$ ∈ {0,−1,−6,−7} and l=l'+Δ$_l$ where Δ$_l$ ∈ {0,1}.

The relation between the CSI-RS RE location and the corresponding RE index can be further specified. For example, assume the location in PRB of the i-th CSI-RS RE labeled in the left figure of FIG. 7B can be represented by (k$_i$,l$_i$), then l$_i$=l'+(i mod 2) for 0≤i<8 and $$k_{2j} = k_{2j+1} = k' - (j \bmod 2) \times 6 - \left\lfloor \frac{j}{2} \right\rfloor$$

for 0≤j<4.

In addition, as shown by the CSI-RS pattern per PRB in FIG. 5 where five CSI-RS per-cell patterns of type2 can fit into one PRB, the allowed values for those five (k',l') can be specified by {(9,5), (9,12), (11,9), (9,9), (7,9)}. If l' is the time symbol index per slot instead of per subframe, the allowed values for those five (k',l') can be specified by {(9,5), (9,5), (11,2), (9,2), (7,2)}.

Figure 6:
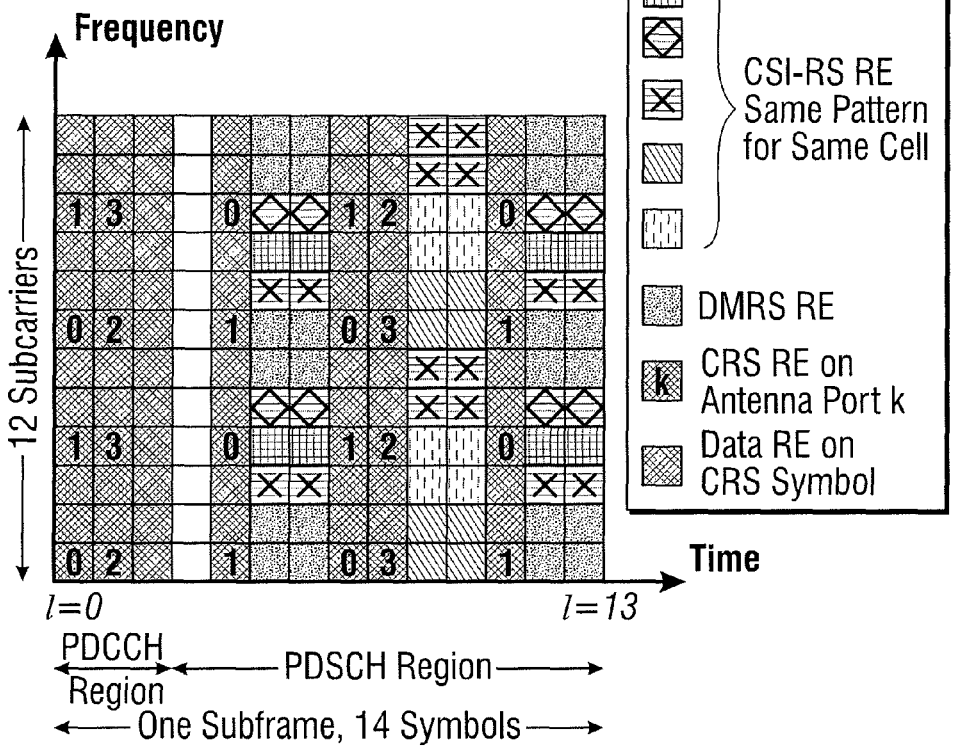
FIG. 6 is an exemplary CSI-RS per-cell pattern with a reuse factor of six, according to one embodiment of the present invention.

In addition, the CSI-RS per-cell pattern type2 can be used together to build the CSI-RS pattern per PRB as shown in FIG. 6, with the CSI-RS pattern reuse factor equal to 6. This CSI-RS pattern shown in FIG. 6 has a specific application in a two-layer co-channel system, where cells on the different layer have roughly different cell size. In such a heterogeneous network scenario, the cells on different layers could adopt different CSI-RS per-cell patterns in FIG. 6 (with reuse factor=3) or adopt any CSI-RS per-cell patterns in FIG. 6 (with reuse factor=6), for example. For the CSI-RS per-cell pattern type3, if it is applied to PRB as shown in FIG. 6 but without a CSI-RS per-cell pattern type2 (so reuse factor is only 3), the frequency domain shifting can be also possible. Assuming k as the subcarrier index corresponding to the RE that carries CSI-RS within one PRB, then k=m·(PCID mod 3)+k$_0$, where m=1 and k$_0$ ∈ {2,7}.

Figure 7A:
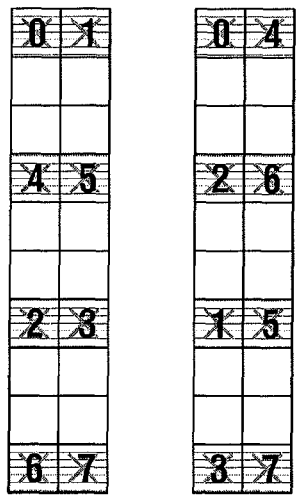
FIG. 7A provides two exemplary options for CSI-RS per-cell pattern (Type 1) RE ordering, according to one embodiment of the present invention.
Figure 7B:
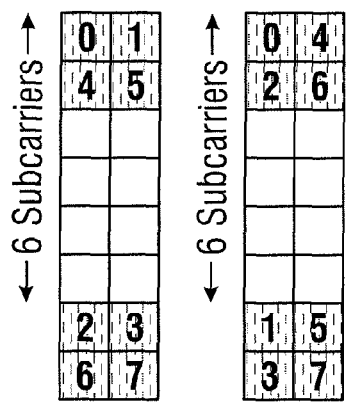
FIG. 7B provides two exemplary options for CSI-RS per-cell pattern (Type 2) RE ordering, according to one embodiment of the present invention.
Figure 7C:
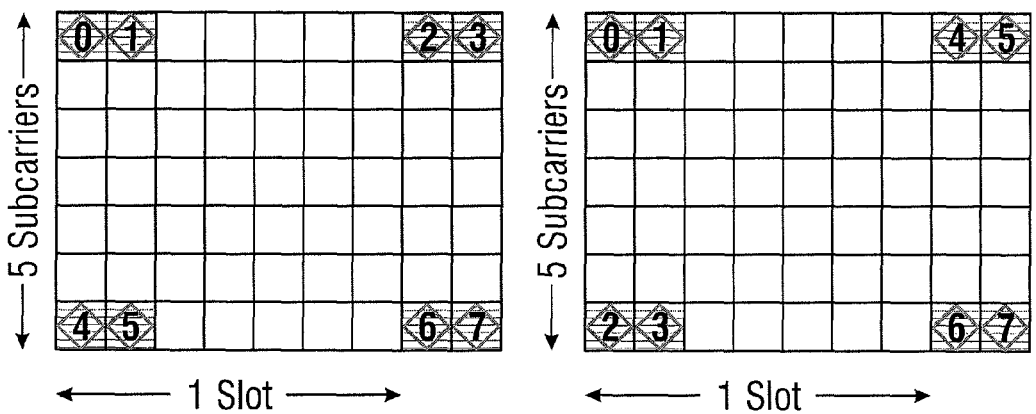
FIG. 7C provides two exemplary options for CSI-RS per-cell pattern (Type 3) RE ordering, according to one embodiment of the present invention.

The CSI-RS RE index ordering in each per-cell pattern can be taken by time domain ordering first, followed by frequency domain ordering, or vice versa, as shown in FIGS. 7A-7C. When the number of antenna ports in a certain cell is less than eight (i.e., equal to 4 or 2), for example, the subset of REs whose RE index belongs to 0~3 or 0~1 in the CSI-RS per-cell pattern type1~3 can be used as a new CSI-RS per-cell pattern to carry 4 or 2 CSI-RS REs. The rest of the REs whose RE index belongs to 4~7 or 2~7 in the original per-cell pattern can be used for additional cells to increase the pattern reuse factor, according to various embodiments. To be more specific, any four CSI-RS REs with indices 0~3 or 4~7 in FIGS. 7A-7C can be used for 4-port CSI-RS allocation, and any two CSI-RS REs with indices (2j) and (2j+1) in FIGS. 7A-7C can be used for 2-port CSI-RS allocation, according to the depicted embodiment.

In case of CDM-T multiplexing for CSI-RS transmission in CSI-RS per-cell pattern type1 and CSI-RS per-cell pattern type2, for example, two CSI-RS ports can share the same pair of REs that are adjacent in the time domain. For example, the first two CSI-RS ports can share the CSI-RS REs {0,1}, the next two CSI-RS ports can share the CSI-RS REs {2,3} and so on.

While various embodiments of the invention have been described above, it should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the invention, whether or not such embodiments are described, and whether or not such features are presented as being a part of a described embodiment. Thus the breadth and scope of the present invention should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of allocating resource elements in an orthogonal frequency division multiplexed (OFDM) system for transmission of a channel state information reference signal (CSI-RS), comprising:
   converting one or more resource elements to a two-dimensional frequency-time domain;
   partitioning the one or more converted resource elements to units of a physical resource block (PRB); and
   patterning one or more resource elements over at least a portion of the PRB for transmission of the CSI-RS,
   wherein the CSI-RS resource elements per cell are patterned within the PRB as pairs of CSI-RS resource elements located within the same two OFDM symbols and at the first, sixth and seventh pair of subcarriers counting downward from the pair of CSI-RS resource elements with a largest subcarrier index on the two OFDM symbols in one PRB.

2. The method of claim 1, wherein the time-domain dimension of one PRB is one subframe.

3. The method of claim 1, further comprising:
   transmitting the CSI-RS using one or more resource elements determined based on whether the one or more resource elements are available to the CSI-RS in a regular downlink subframe that includes at least one of a cell-specific reference signal (CRS), a physical downlink control channel (PDCCH) and a demodulation reference signal (DMRS).

4. The method of claim 1, wherein the same two OFDM symbols where pairs of CSI-RS resource elements can be allocated are symbol 5 and symbol 6 in either slot of one subframe, or symbol 2 and symbol 3 in the second slot of one subframe.

5. The method of claim 1, wherein the largest subcarrier index of the pair of CSI-RS resource elements in one PRB can be any value from $\{7,9,11\}$.

6. The method of claim 1, wherein
   the CSI-RS resource elements are allocated to symbols $\{9,10\}$, and a reuse factor is three, or
   the CSI-RS resource elements are allocated to symbols $\{5,6\}$, $\{9,10\}$ and $\{12,13\}$, and a reuse factor is five.

7. The method of claim 1, wherein CSI-RS RE index ordering in each pattern can be taken by time domain ordering and frequency domain ordering, and the location within the PRB of the i-th CSI-RS RE, represented by $(k_i, l_i)$, is given by $l_i = l' + (i \bmod 2)$ for $0 \leq i < 8$ and $$k_{2j} = k_{2j+1} = k' - (j \bmod 2) \times 6 - \left\lfloor \frac{j}{2} \right\rfloor$$

for $0 \leq j < 4$, where (k',l') is the location of a CSI-RS resource element with a largest subcarrier index and smallest symbol index in each CSI-RS per-cell pattern.

8. The method of claim 7, wherein
   if a number of antenna ports in a certain cell is less than eight, a subset of resource elements with indices 0-3 or 0-1 in the CSI-RS per-cell pattern is used as a new CSI-RS per-cell pattern to transmit the CSI-RS, and resource elements with indices 4-7 or 2-7 in the CSI-RS per-cell pattern are used to transmit CSI-RS from additional cells to increase a pattern reuse factor, with 4-port CSI-RS on resource elements with indices 4-7, and 2-port CSI-RS on resource elements with indices 2j and 2j+1, wherein j is an integer.

9. A method of allocating resource elements in an orthogonal frequency division multiplexed (OFDM) system for transmission of a channel state information reference signal (CSI-RS), comprising:

converting one or more resource elements to a two-dimensional frequency-time domain;

partitioning the one or more converted resource elements to units of a physical resource block (PRB); and patterning one or more resource elements over at least a portion of the PRB for transmission of the CSI-RS, wherein the CSI-RS resource elements per cell are patterned within the PRB as pairs of CSI-RS resource elements located within the same two ODFM symbols at every third pair of subcarriers counting downward from the pair of CSI-RS resource elements with a largest subcarrier index on the two OFDM symbols in one PRB, and wherein the same two OFDM symbols where pairs of CSI-RS resource elements can be allocated are symbol 9 and symbol 10, resulting in a reuse factor equal to 3.

10. The method of claim 9, wherein CSI-RS RE index ordering in each pattern can be taken by time domain ordering and frequency domain ordering, and the location within the PRB of the i-th CSI-RS RE, represented by $(k_i, l_i)$, is given by $l_i = l' + (i \bmod 2)$ for $0 \leq i < 8$ and $$k_{2j} = k_{2j+1} = k' - (j \bmod 2) \times 6 - \left\lfloor \frac{j}{2} \right\rfloor \times 3$$

for $0 \leq j < 4$, where (k',l') is the location of a CSI-RS resource element with a largest subcarrier index and smallest symbol index in each CSI-RS per-cell pattern.

11. The method of claim 9, wherein if a number of antenna ports in a certain cell is less than eight, a subset of resource elements with indices 0-3 or 0-1 in the CSI-RS per-cell pattern is used as a new CSI-RS per-cell pattern to transmit a 4-port CSI-RS or 2-port CSI-RS, and resource elements with indices 4-7 or 2-7 in the CSI-RS per-cell pattern are used to transmit CSI-RS from additional cells to increase a pattern reuse factor, with 4-port CSI-RS on resource elements with indices 4-7, and 2-port CSI-RS on resource elements with indices 2j and 2j+1, where j is an integer.

12. A station configured to allocate resource elements in an orthogonal frequency division multiplexed (OFDM) system for transmission of a channel state information reference signal (CSI-RS), comprising:

a converting unit configured to convert one or more resource elements to a two-dimensional frequency-time domain;

a partitioning unit configured to partition the one or more converted resource elements to units of a physical resource block (PRB); and a patterning unit configured to pattern one or more resource elements over at least a portion of the PRB for transmission of the CSI-RS, wherein the CSI-RS resource elements per cell are patterned within the PRB as pairs of CSI-RS resource elements located within the same two OFDM symbols and at the first, sixth and seventh pair of subcarriers counting downward from the pair of CSI-RS resource elements with a largest subcarrier index on the two OFDM symbols in one PRB.

13. The station of claim 12, wherein the time-domain dimension of one PRB is one subframe.

14. The station of claim 12, further comprising:

a transmitter configured to transmit the CSI-RS using one or more resource elements determined based on whether the one or more resource elements are available to the CSI-RS in a regular downlink subframe that includes at least one of a cell-specific reference signal (CRS), a physical downlink control channel (PDCCH) and a demodulation reference signal (DMRS).

15. The station of claim 12, wherein the same two OFDM symbols where pairs of CSI-RS resource elements can be allocated are symbol 5 and symbol 6 in either slot of one subframe, or symbol 2 and symbol 3 in the second slot of one subframe.

16. The station of claim 12, wherein the largest subcarrier index of the pair of CSI-RS resource elements in one PRB can be any value from {7,9,11}.

17. The station of claim 12, wherein the CSI-RS resource elements are allocated to symbols {9,10}, and a reuse factor is three, or the CSI-RS resource elements are allocated to symbols {5,6}, {9,10} and {12,13}, and a reuse factor is five.

18. The station of claim 12, wherein CSI-RS RE index ordering in each pattern can be taken by time domain ordering and frequency domain ordering, and the location within the PRB of the i-th CSI-RS RE, represented by $(k_i, l_i)$, is given by $l_i = l' + (i \bmod 2)$ for $0 \leq i < 8$ and $$k_{2j} = k_{2j+1} = k' - (j \bmod 2) \times 6 - \left\lfloor \frac{j}{2} \right\rfloor$$

for $0 \leq j < 4$, where (k',l') is the location of a CSI-RS resource element with a largest subcarrier index and smallest symbol index in each CSI-RS per-cell pattern.

19. The station of claim 18, wherein if a number of antenna ports in a certain cell is less than eight, a subset of resource elements with indices 0-3 or 0-1 in the CSI-RS per-cell pattern is used as a new CSI-RS per-cell pattern to transmit the CSI-RS, and resource elements with indices 4-7 or 2-7 in the CSI-RS per-cell pattern are used to transmit CSI-RS from additional cells to increase a pattern reuse factor, with 4-port CSI-RS on resource elements with indices 4-7, and 2-port CSI-RS on resource elements with indices 2j and 2j+1, wherein j is an integer.

20. The station of claim 12, wherein the station is a base station.

21. A station configured to allocate resource elements in an orthogonal frequency division multiplexed (OFDM) system for transmission of a channel state information reference signal (CSI-RS), comprising:

a converting unit configured to convert one or more resource elements to a two-dimensional frequency-time domain;

a partitioning unit configured to partition the one or more converted resource elements to units of a physical resource block (PRB); and a patterning unit configured to pattern one or more resource elements over at least a portion of the PRB for transmission of the CSI-RS, wherein the CSI-RS resource elements per cell are patterned within the PRB as pairs of CSI-RS resource elements located within the same two ODFM symbols at every third pair of subcarriers counting downward from the pair of CSI-RS resource elements with a largest subcarrier index on the two OFDM symbols in one PRB, and wherein the same two OFDM symbols where pairs of CSI-RS resource elements can be allocated are symbol 9 and symbol 10, resulting in a reuse factor equal to 3.

22. The station of claim 21, wherein CSI-RS RE index ordering in each pattern can be taken by time domain ordering and frequency domain ordering, and the location within the PRB of the i-th CSI-RS RE, represented by $(k_i,l_i)$, is given by $l_i=l'+(i \bmod 2)$ for $0 \le i < 8$ and $$k_{2j} = k_{2j+1} = k' - (j \bmod 2) \times 6 - \left\lfloor \frac{j}{2} \right\rfloor \times 3$$

for $0 \le j < 4$, where (k',l') is the location of a CSI-RS resource element with a largest subcarrier index and smallest symbol index in each CSI-RS per-cell pattern.

23. The station of claim 21, wherein
if a number of antenna ports in a certain cell is less than eight, a subset of resource elements with indices 0-3 or 0-1 in the CSI-RS per-cell pattern is used as a new CSI-RS per-cell pattern to transmit a 4-port CSI-RS or 2-port CSI-RS, and resource elements with indices 4-7 or 2-7 in the CSI-RS per-cell pattern are used to transmit CSI-RS from additional cells to increase a pattern reuse factor, with 4-port CSI-RS on resource elements with indices 4-7, and 2-port CSI-RS on resource elements with indices 2j and 2j+1, where j is an integer.

24. A non-transitory computer-readable medium storing instructions thereon to perform a method of allocating resource elements in an orthogonal frequency division multiplexed (OFDM) system for transmission of a channel state information reference signal (CSI-RS), the method comprising:

converting one or more resource elements to a two-dimensional frequency-time domain;

partitioning the one or more converted resource elements to units of a physical resource block (PRB); and patterning one or more resource elements over at least a portion of the PRB for transmission of the CSI-RS, wherein the CSI-RS resource elements per cell are patterned within the PRB as pairs of CSI-RS resource elements located within the same two OFDM symbols and at the first, sixth and seventh pair of subcarriers counting downward from the pair of CSI-RS resource elements with a largest subcarrier index on the two OFDM symbols in one PRB.

25. The computer-readable medium of claim 24, wherein the time-domain dimension of one PRB is one subframe.

26. The computer-readable medium of claim 24, the method further comprising:

transmitting the CSI-RS using one or more resource elements determined based on whether the one or more resource elements are available to the CSI-RS in a regular downlink subframe that includes at least one of a cell-specific reference signal (CRS), a physical downlink control channel (PDCCH) and a demodulation reference signal (DMRS).

27. The computer-readable medium of claim 24, wherein the same two OFDM symbols where pairs of CSI-RS resource elements can be allocated are symbol 5 and symbol 6 in either slot of one subframe, or symbol 2 and symbol 3 in the second slot of one subframe.

28. The computer-readable medium of claim 24, wherein the largest subcarrier index of the pair of CSI-RS resource elements in one PRB can be any value from {7,9,11}.

29. The computer-readable medium of claim 24, wherein the CSI-RS resource elements are allocated to symbols {9, 10}, and a reuse factor is three, or
the CSI-RS resource elements are allocated to symbols {5,6}, {9,10} and {12,13}, and a reuse factor is five.

30. The computer-readable medium of claim 24, wherein CSI-RS RE index ordering in each pattern can be taken by time domain ordering and frequency domain ordering, and the location within the PRB of the i-th CSI-RS RE, represented by $(k_i,l_i)$, is given by $l_i=l'+(i \bmod 2)$ for $0 \le i < 8$ and $$k_{2j} = k_{2j+1} = k' - (j \bmod 2) \times 6 - \left\lfloor \frac{j}{2} \right\rfloor$$

for $0 \le j < 4$, where (k', l') is the location of a CSI-RS resource element with a largest subcarrier index and smallest symbol index in each CSI-RS per-cell pattern.

31. The computer-readable medium of claim 30, wherein
if a number of antenna ports in a certain cell is less than eight, a subset of resource elements with indices 0-3 or 0-1 in the CSI-RS per-cell pattern is used as a new CSI-RS per-cell pattern to transmit the CSI-RS, and resource elements with indices 4-7 or 2-7 in the CSI-RS per-cell pattern are used to transmit CSI-RS from additional cells to increase a pattern reuse factor, with 4-port CSI-RS on resource elements with indices 4-7, and 2-port CSI-RS on resource elements with indices 2j and 2j+1, wherein j is an integer.

32. A non-transitory computer-readable medium storing instructions thereon to perform a method of allocating resource elements in an orthogonal frequency division multiplexed (OFDM) system for transmission of a channel state information reference signal (CSI-RS), the method comprising:

converting one or more resource elements to a two-dimensional frequency-time domain;

partitioning the one or more converted resource elements to units of a physical resource block (PRB); and patterning one or more resource elements over at least a portion of the PRB for transmission of the CSI-RS, wherein the CSI-RS resource elements per cell are patterned within the PRB as pairs of CSI-RS resource elements located within the same two ODFM symbols at every third pair of subcarriers counting downward from the pair of CSI-RS resource elements with a largest subcarrier index on the two OFDM symbols in one PRB and wherein the same two OFDM symbols where pairs of CSI-RS resource elements can be allocated are symbol 9 and symbol 10, resulting in a reuse factor equal to 3.

33. The computer-readable medium of claim 32, wherein CSI-RS RE index ordering in each pattern can be taken by time domain ordering and frequency domain ordering, and the location within the PRB of the i-th CSI-RS RE, represented by $(k_i, l_i)$, is given by $l_i = l' + (i \bmod 2)$ for $0 \leq i < 8$ and $$k_{2j} = k_{2j+1} = k' - (j \bmod 2) \times 6 - \left\lfloor \frac{j}{2} \right\rfloor \times 3$$

for $0 \leq j < 4$, where $(k', l')$ is the location of a CSI-RS resource element with a largest subcarrier index and smallest symbol index in each CSI-RS per-cell pattern.

34. The computer-readable medium of claim 32, wherein
if a number of antenna ports in a certain cell is less than eight, a subset of resource elements with indices 0-3 or 0-1 in the CSI-RS per-cell pattern is used as a new CSI-RS per-cell pattern to transmit a 4-port CSI-RS or 2-port CSI-RS, and resource elements with indices 4-7 or 2-7 in the CSI-RS per-cell pattern are used to transmit CSI-RS from additional cells to increase a pattern reuse factor, with 4-port CSI-RS on resource elements with indices 4-7, and 2-port CSI-RS on resource elements with indices 2j and 2j+1, where j is an integer.

* * * * *